(12) United States Patent
Mestha et al.

(10) Patent No.: US 10,452,845 B2
(45) Date of Patent: Oct. 22, 2019

(54) GENERIC FRAMEWORK TO DETECT CYBER THREATS IN ELECTRIC POWER GRID

(71) Applicant: General Electric Company, Schenectady, NY (US)

(72) Inventors: Lalit Keshav Mestha, North Colonie, NY (US); Santosh Sambamoorthy Veda, Niskayuna, NY (US); Masoud Abbaszadeh, Clifton Park, NY (US); Chaitanya Ashok Baone, Niskayuna, NY (US); Weizhong Yan, Clifton Park, NY (US); Saikat Ray Majumder, Niskayuna, NY (US); Sumit Bose, Niskayuna, NY (US); Annartia Giani, Niskayuna, NY (US); Olugbenga Anubi, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 146 days.

(21) Appl. No.: 15/453,544

(22) Filed: Mar. 8, 2017

(65) Prior Publication Data
US 2018/0260561 A1    Sep. 13, 2018

(51) Int. Cl.
*G06F 21/55* (2013.01)
*G05B 23/02* (2006.01)

(52) U.S. Cl.
CPC ....... *G06F 21/554* (2013.01); *G05B 23/0275* (2013.01); *G06F 2221/034* (2013.01); *Y04S 10/522* (2013.01)

(58) Field of Classification Search
CPC ............ G06F 21/554; G06F 2221/034; G05B 23/0275; Y04S 10/522
See application file for complete search history.

(56) References Cited

U.S. PATENT DOCUMENTS 8,595,831 B2    11/2013    Skare
2005/0123031 A1*   6/2005   Hunt ...................... H04B 3/238
                                                    375/224

(Continued)

FOREIGN PATENT DOCUMENTS

WO    2015089448 A1    6/2015

OTHER PUBLICATIONS

Sridhar, Siddharth et al., "Cyber—Physical System Security for the Electric Power Grid", Proceedings of the IEEE, vol. 100, No. 1, Jan. 2012, DOI: 10.1109/JPROC.2011.2165269, (pp. 210-224, 15 total pages).

(Continued)

*Primary Examiner* — Meng Li
(74) *Attorney, Agent, or Firm* — Buckley, Maschoff & Talwalkar LLC

(57) ABSTRACT

According to some embodiments, a plurality of heterogeneous data source nodes may each generate a series of current data source node values over time that represent a current operation of an electric power grid. A real-time threat detection computer, coupled to the plurality of heterogeneous data source nodes, may receive the series of current data source node values and generate a set of current feature vectors. The threat detection computer may then access an abnormal state detection model having at least one decision boundary created offline using at least one of normal and abnormal feature vectors. The abnormal state detection model may be executed, and a threat alert signal may be transmitted if appropriate based on the set of current feature vectors and the at least one decision boundary.

18 Claims, 14 Drawing Sheets

(56) References Cited

U.S. PATENT DOCUMENTS

| | | |
|---|---|---|
| 2011/0282508 A1 | 11/2011 | Goutard et al. |
| 2012/0284790 A1 | 11/2012 | Bhargava |
| 2013/0191052 A1 | 7/2013 | Fernandez et al. |
| 2016/0127907 A1 | 5/2016 | Baxley et al. |
| 2016/0253495 A1 | 9/2016 | Kolacinski et al. |
| 2016/0366170 A1 | 12/2016 | Bell |
| 2017/0054751 A1* | 2/2017 | Schneider .......... H04L 63/1425 |
| 2017/0061322 A1* | 3/2017 | Chari .................. G06N 99/005 |

OTHER PUBLICATIONS

Wei, Jin, "A Data-Driven Cyber—Physical Detection and Defence Strategy Against Data Integrity Attacks in Smart Grid Systems", IEEE Global Conference on Signal and Information Processing (GlobalSIP), Dec. 14-16, 2015, (pp. 1-5, 5 total pages).

Li, Beibei et al., "DDOA: A Dirichlet-Based Detection Scheme for Opportunistic Attacks in Smart Grid Cyber-Physical System", IEEE Transactions on Information Forensics and Security, vol. 11, Issue 11, Nov. 2016, DOI: 10.1109/TIFS.2016.2576898, (pp. 2415-2425, 11 total pages).

Isozaki, Yasunori et al., "Detection of Cyber Attacks Against Voltage Control in Distribution Power Grids With PVs", IEEE Transactions on Smart Grid, vol. 7, Issue 4, Jul. 2016, DOI: 10.1109/TSG.2015.2427380, (pp. 1824-1835, 12 total pages).

Extended European Search Report and Opinion issued in connection with corresponding EP Application No. 18160275.6 dated Aug. 16, 2018.

* cited by examiner

| ALERT IDENTIFIER 1302 | POWER GRID IDENTIFIER 1304 | DATE (TIME) 1306 | DESCRIPTION 1308 |
|---|---|---|---|
| A_101 | PG_1001 | 7/15/1019 (11:45:00) | THREAT |
| A_102 | PG_1001 | 7/15/2019 (13:22:00) | SPOOF |
| A_103 | PG_1001 | 7/15/2019 (23:12:00) | EARLY WARNING |
| A_104 | PG_1001 | 7/16/2019 (04:31:00) | THREAT |

FIG. 13

GENERIC FRAMEWORK TO DETECT CYBER THREATS IN ELECTRIC POWER GRID

BACKGROUND

Electric power grids are increasingly connected to the Internet. As a result, electric power grids may be vulnerable to threats, such as cyber-attacks (e.g., associated with a computer virus, malicious software, etc.), that could disrupt electric power generation and distribution, damage equipment, etc. Current methods of protection from this type of harm primarily consider threat detection in Information Technology ("IT," such as, computers that store, retrieve, transmit, manipulate data) and Operation Technology ("OT," such as direct monitoring devices and communication bus interfaces). Cyber-threats can still penetrate through these protection layers and reach the physical "domain." Such attacks can diminish the performance of an electric power grid and may cause a total shut down or even catastrophic damage. Currently, Fault Detection Isolation and Accommodation ("FDIA") approaches only analyze sensor data, but a threat might occur in connection with other types of data source nodes. Also note that FDIA is limited only to naturally occurring faults in one sensor at a time. FDIA systems do not address multiple simultaneously occurring faults as they are normally due to malicious intent. It would therefore be desirable to protect an electric power grid from malicious intent such as cyber-attacks in an automatic and accurate manner.

SUMMARY

According to some embodiments, a plurality of heterogeneous data source nodes may each generate a series of current data source node values over time that represent a current operation of an electric power grid. A real-time threat detection computer, coupled to the plurality of heterogeneous data source nodes, may receive the series of current data source node values and generate a set of current feature vectors. The threat detection computer may then access an abnormal state detection model having at least one decision boundary created offline using a set of feature vectors. The abnormal state detection model may be executed, and a threat alert signal may be transmitted if appropriate based on the set of current feature vectors and the at least one decision boundary.

Some embodiments comprise: means for retrieving, for each of a plurality of heterogeneous data source nodes, a series of normal data source node values over time that represent normal operation of the electric power grid; means for generating, offline, a set of normal feature vectors based on the normal data source node values; means for retrieving, for each of the plurality of data source nodes, a series of abnormal data source node values over time that represent an abnormal operation of the electric power grid; means for generating a set of abnormal feature vectors based on the abnormal data source node values; and means for automatically calculating and outputting, by an offline abnormal state detection model creation computer, at least one decision boundary for an abnormal state detection model based on the set of normal feature vectors and the set of abnormal feature vectors.

Other embodiments comprise: means for receiving, from a plurality of heterogeneous data source nodes, a series of current data source node values over time that represent a current operation of the electric power grid; means for accessing, by a real-time threat detection computer, an abnormal state detection model having at least one decision boundary created offline using a set of feature vectors; and means for executing the abnormal state detection model and transmitting a threat alert signal based on the set of current feature vectors and the at least one decision boundary.

Some technical advantages of some embodiments disclosed herein are improved systems and methods to protect an electric power grid from malicious intent such as cyber-attacks in an automatic and accurate manner.

BRIEF DESCRIPTION OF THE DRAWINGS

FIG. 13 is a tabular portion of an alert database according to some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Figure 1:
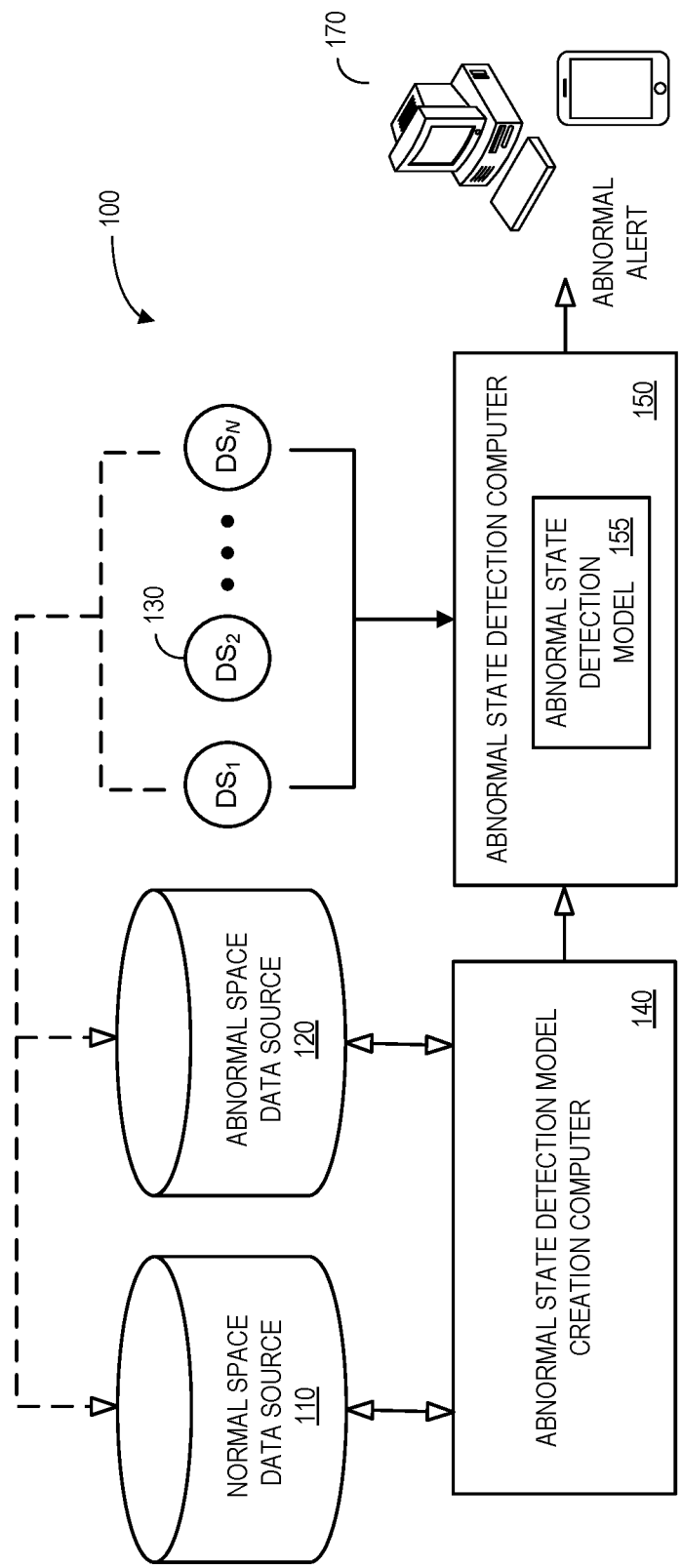
FIG. 1 is a high-level block diagram of a system that may be provided in accordance with some embodiments.

Electric power grids are increasingly connected to the Internet. As a result, these power grids may be vulnerable to threats and, in some cases, multiple attacks may occur simultaneously. Existing approaches to protect an electric power grid, such as FDIA approaches, might not adequately address these threats. It would therefore be desirable to protect an electric power grid from malicious intent such as cyber-attacks in an automatic and accurate manner. FIG. 1 is a high-level architecture of a system 100 in accordance with some embodiments. The system 100 may include a "normal space" data source 110 and an "abnormal space" data source 120. The normal space data source 110 might store, for each of a plurality of heterogeneous "data source nodes" 130 (shown in FIG. 1 as "DS1," "DS2," . . . "DSN" for "1, 2, . . . N" different data source nodes), a series of normal values over time that represent normal operation of an electric power grid (e.g., generated by a model or collected from actual data source node 130 data as illustrated by the dashed line in FIG. 1). As used herein, the phrase "data source node" might refer to, for example, sensor data, signals sent to actuators, and auxiliary equipment, intermediary parameters that are not direct sensor signals and/or control logical(s). These may represent, for example, threat data source nodes that receive data from the threat monitoring system in a continuous fashion in the form of continuous signals or streams of data or combinations thereof. Moreover, the nodes 130 may be used to monitor occurrences of cyber-threats or abnormal events. This data path may be designated specifically with encryptions or other protection mechanisms so that the information may be secured and cannot be tampered with via cyber-attacks. The abnormal space data source 120 might store, for each of the data source nodes 130, a series of abnormal values that represent an abnormal operation of the electric power grid (e.g., when the system is experiencing a cyber-attack). According to some embodiments, the data source nodes 130 provide "heterogeneous" data. That is, the data may represent information from widely diverse areas, such as social media data, wireless network data (e.g., Wi-Fi data), weather data (e.g., temperature data, National Oceanic and Atmospheric Administration ("NOAA") information, etc.), IT inputs, market pricing, etc. According to some embodiments, the data source nodes 130 are associated with geo-stamped geographically separated heterogeneous sensors.

Information from the normal space data source 110 and the abnormal space data source 120 may be provided to an offline abnormal state detection model creation computer 140 that uses this data to create a decision boundary (that is, a boundary that separates normal behavior from abnormal behavior). The decision boundary may then be used by an abnormal state detection computer 150 executing an abnormal state detection model 155. The abnormal state detection model 155 may, for example, monitor streams of data from the data source nodes 130 comprising data from sensor nodes, actuator nodes, and/or any other critical data source nodes (e.g., data source nodes $DS_1$ through $DS_N$), calculate at least one "feature" for each data source node based on the received data, and "automatically" output a threat alert signal to one or more remote monitoring devices 170 when appropriate (e.g., for display to a user). According to some embodiments, a threat alert signal might be transmitted to a unit controller, a plant Human-Machine Interface ("HMI"), or to a customer via a number of different transmission methods. Note that one receiver of a threat alert signal might be a cloud database that correlates multiple attacks on a wide range of power grid assets. As used herein, the term "feature" may refer to, for example, mathematical characterizations of data. Examples of features as applied to data might include the maximum, minimum, mean, standard deviation, variance, range, current value, settling time, Fast Fourier Transform ("FFT") spectral components, linear and non-linear principal components, independent components, sparse coding features, deep learning features, etc. Moreover, term "automatically" may refer to, for example, actions that can be performed with little or no human intervention. According to some embodiments, information about a detected threat may be transmitted back to the electric power grid.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The offline abnormal state detection model creation computer 140 may store information into and/or retrieve information from various data sources, such as the normal space data source 110 and/or the abnormal space data source 120. The various data sources may be locally stored or reside remote from the offline abnormal state detection model creation computer 140 (which might be associated with, for example, offline or online learning). Although a single offline abnormal state detection model creation computer 140 is shown in FIG. 1, any number of such devices may be included. Moreover, various devices described herein might be combined according to embodiments of the present invention. For example, in some embodiments, the offline abnormal state detection model creation computer 140 and one or more data sources 110, 120 might comprise a single apparatus. The offline abnormal state detection model creation computer 140 functions may be performed by a constellation of networked apparatuses, in a distributed processing or cloud-based architecture.

A user may access the system 100 via one of the monitoring devices 170 (e.g., a Personal Computer ("PC"), tablet, or smartphone) to view information about and/or manage threat information in accordance with any of the embodiments described herein. In some cases, an interactive graphical display interface may let a user define and/or adjust certain parameters (e.g., abnormal state detection trigger levels) and/or provide or receive automatically generated recommendations or results from the offline abnormal state detection model creation computer 140 and/or abnormal state detection computer 150.

Figure 2:
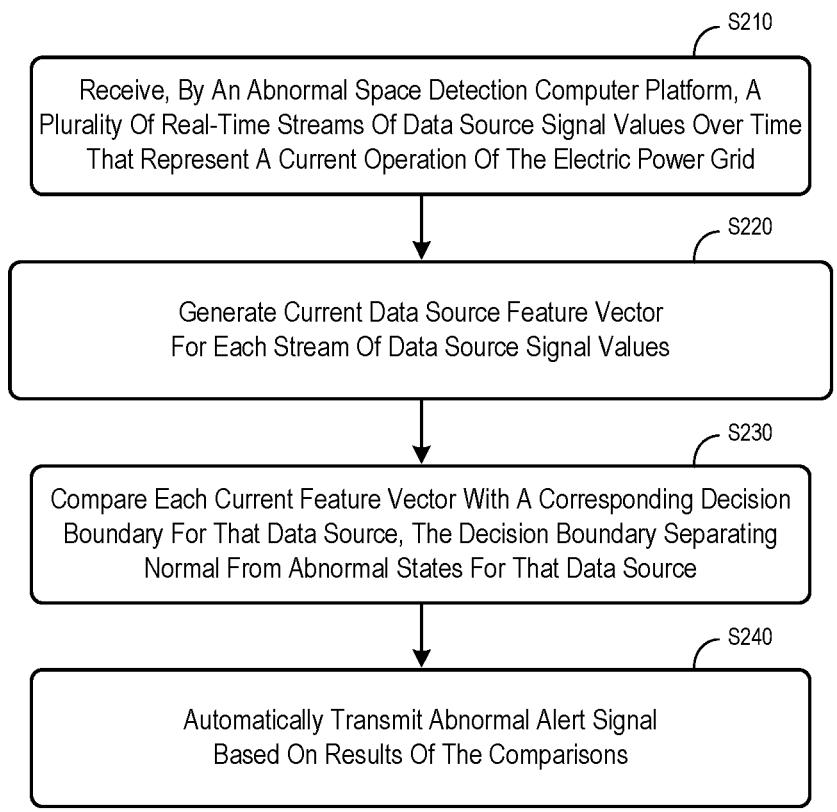
FIG. 2 is a method according to some embodiments.

For example, FIG. 2 illustrates a method that might be performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a plurality of real-time heterogeneous data source node signal inputs may receive streams of data source node signal values over time that represent a current operation of an electric power grid. At least one of the data source nodes (e.g., controller nodes, etc.) may be associated with, for example, sensor data, an auxiliary equipment input signal, a control intermediary parameter, and/or a control logic value.

At S220, a real-time threat detection computer platform may receive the streams of data source node signal values and, for each stream of data source node signal values, generate a current data source node feature vector. According to some embodiments, at least one of the current data source node feature vectors is associated with principal components, statistical features, deep learning features, frequency domain features, time series analysis features, logical features, geographic or position based locations, and/or interaction features.

At S230, each generated current data source node feature vector may be compared to a corresponding decision boundary (e.g., a linear boundary, non-linear boundary, multi-dimensional boundary, etc.) for that data source node in substantially real-time, the decision boundary separating a normal state from an abnormal state for that data source node. According to some embodiments, at least one data source node is associated with a plurality of multi-dimensional decision boundaries and the comparison at S230 is performed in connection with each of those boundaries. Note that a decision boundary might be generated, for example, in accordance with a feature-based learning algorithm and a high fidelity model or a normal operation of the electric power grid. Moreover, at least one decision boundary may exist in a multi-dimensional space and be associated with a dynamic model which is constructed using data obtained from design of experiments such as, a full factorial design, Taguchi screening design, a central composite methodology, a Box-Behnken methodology, and a real-world operating conditions methodology. In addition, an abnormal state detection model associated with a decision boundary might, according to some embodiments, be dynamically obtained and adapted based on a transient condition, a steady state model of the electric power grid, and/or data sets obtained while operating the system as in self-learning systems from incoming data stream.

At S240, the system may automatically transmit an abnormal alert signal (e.g., a notification message, etc.) based on results of the comparisons performed at S230. The abnormal state might be associated with, for example, an actuator attack, a controller attack, a data source node attack, a plant state attack, spoofing, physical damage, unit availability, a unit trip, a loss of unit life, asset damage requiring at least one new part, a stealthy attack not detectable by alarms, a load alternating attack, a topology change attack, a stability compromise attack, and/or a frequency compromise attack. According to some embodiments, one or more response actions may be performed when an abnormal alert signal is transmitted. For example, the system might automatically shut down all or a portion of the electric power grid (e.g., to let the detected potential cyber-attack be further investigated). As other examples, one or more parameters might be automatically modified, a software application might be automatically triggered to capture data and/or isolate possible causes, etc. Note that a threat alert signal might be transmitted via a cloud-based system, such as the PREDIX® field agent system. Note that according to some embodiments, a cloud approach might also be used to archive information and/or to store information about boundaries.

According to some embodiments, the system may further localize an origin of the threat to a particular data source node (e.g., including localization for a power grid at a high level). For example, the localizing may be performed in accordance with a time at which a decision boundary associated with one data source node was crossed as compared to a time at which a decision boundary associated with another data source node was crossed. According to some embodiments, an indication of the particular data source node might be included in the abnormal alert signal.

Some embodiments described herein may take advantage of the physics of an electric power grid by learning a priori from tuned high fidelity equipment models and/or actual "on the job" data to detect single or multiple simultaneous adversarial threats to the system. Moreover, according to some embodiments, all data source node data may be converted to features using advanced feature-based methods, and the real-time operation of the power grid may be monitoring in substantially real-time. Abnormalities may be detected by classifying the monitored data as being "normal" or disrupted (or degraded). This decision boundary may be constructed using dynamic models and may help to enable early detection of vulnerabilities (and potentially avert catastrophic failures) allowing an operator to restore the power grid to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines, noe of the machine learning techniques) may be used to generate decision boundaries. Since boundaries may be driven by measured data (or data generated from high fidelity models), defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account an operator's knowledge about system operation (e.g., the differences between normal and abnormal operation).

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, interaction features (mathematical combinations of signals from multiple data source nodes and specific locations), range, and current value. Embodiments may incorporate any number of features, with more features allowing the approach to become more accurate as the system learns more about the physical process and threat. According to some embodiments, dissimilar values from data source nodes may be normalized to unit-less space, which may allow for a simple way to compare outputs and strength of outputs.

Thus, some embodiments may provide an advanced anomaly detection algorithm to detect cyber-attacks on, for example, key power grid sensors. The algorithm may identify which signals(s) are being attacked using data source node-specific decision boundaries and may inform a control system to take accommodative actions. In particular, a detection and localization algorithm might detect whether a sensor, auxiliary equipment input signal, control intermediary parameter, or control logical are in a normal or anomalous state.

Some embodiments of the algorithm may utilize feature-based learning techniques based on high fidelity physics models and/or machine operation data (which would allow the algorithm to be deployed on any system) to establish a high dimensional decision boundary. As a result, detection may occur with more precision using multiple signals, making the detection more accurate with less false positives. Moreover, embodiments may detect multiple attacks on data source node data, and rationalize where the root cause attack originated.

Figure 3:
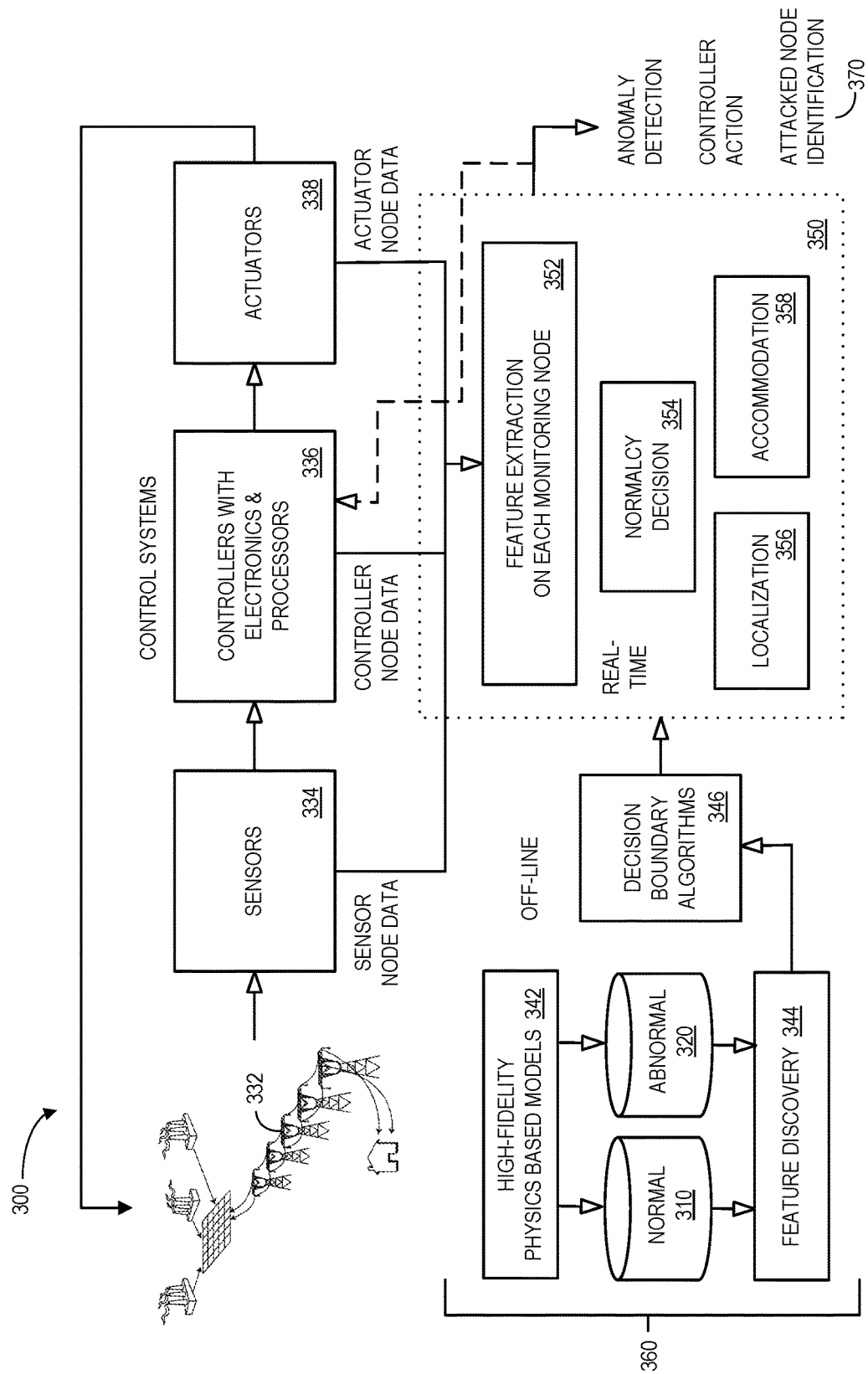
FIG. 3 is threat alert system in accordance with some embodiments.

A cyber-attack detection and localization algorithm may process a real-time power grid signal data stream and then compute features (multiple identifiers) which can then be compared to the sensor specific decision boundary. Note that monitoring nodes other than a sensor might be incorporated in accordance with any of the embodiments described herein (e.g., an actuator node, a controller node, etc.). A block diagram of a system 300 utilizing a sensor specific power grid cyber-attack detection and localization algorithm according to some embodiments is provided in FIG. 3. In particular, a power grid 332 provides information to sensors 334 which helps controllers with electronics and processors 336 adjust actuators 338. An offline abnormal state detection system 360 may include one or more high-fidelity physics based models 342 associated with the power grid 332 to create normal data 310 and/or abnormal data 320. The normal data 310 and abnormal data 320 may be accessed by a feature discovery component 344 and processed by decision boundary algorithms 346 while off-line (e.g., not necessarily while the power grid 332 is operating). The decision boundary algorithms 346 may generate a threat model including decision boundaries for various data source nodes. Each decision boundary may separate two data sets in a high dimensional space which is constructed by running a binary classification algorithm, such as a support vector machine using the normal data 310 and abnormal data 320 for each data source node signal (e.g., from the sensors 334, controllers 336, and/or the actuators 338).

A real-time threat detection platform 350 may receive the boundaries along with streams of data from the data source nodes. The platform 350 may include a feature extraction on each data source node element 352 and a normalcy decision 354 with an algorithm to detect attacks in individual signals using sensor specific decision boundaries, as well rationalize attacks on multiple signals, to declare which signals were attacked, and which became anomalous due to a previous attack on the system via a localization module 356. An accommodation element 358 may generate outputs 370, such as an anomaly decision indication (e.g., threat alert signal), a controller action, and/or a list of attached data source nodes.

During real-time detection, continuous batches of data source node data may be processed by the platform 350, normalized and the feature vector extracted. The location of the vector for each signal in high-dimensional feature space may then be compared to a corresponding decision boundary. If it falls within the attack region, then a cyber-attack may be declared. The algorithm may then make a decision about where the attack originally occurred. An attack may sometimes be on the actuators 338 and then manifested in the sensors 334 data. Attack assessments might be performed in a post decision module (e.g., the localization element 356) to isolate whether the attack is related any of the sensor, controller, or actuator (e.g., indicating which part of the data source node). This may be done by individually monitoring, overtime, the location of the feature vector with respect to the decision boundary. For example, when a sensor 334 is spoofed, the attacked sensor feature vector will cross the decision boundary earlier than the rest of the vectors as described with respect to FIG. 4. If a sensor is declared to be anomalous, and the load command to the auxiliary equipment is later determined to be anomalous, it may be determined that the original attack, such as signal spoofing, occurred on the sensor 334. Conversely, if the signal to the auxiliary equipment was determined to be anomalous first, and then later manifested in the sensor 334 feedback signal, it may be determined that the signal to the equipment was initially attacked.

According to some embodiments, it may be detected whether or not a signal is in the normal operating space (or abnormal space) through the use of localized decision boundaries and real time computation of the specific signal features. Moreover, an algorithm may differentiate between a sensor being attacked (or an actuator node being attacked) as compared to a signal to auxiliary equipment being attacked. The control intermediary parameters and control logical(s) may also be analyzed using similar methods. Note that an algorithm may rationalize signals that become anomalous. An attack on a signal may then be identified.

Figure 4:
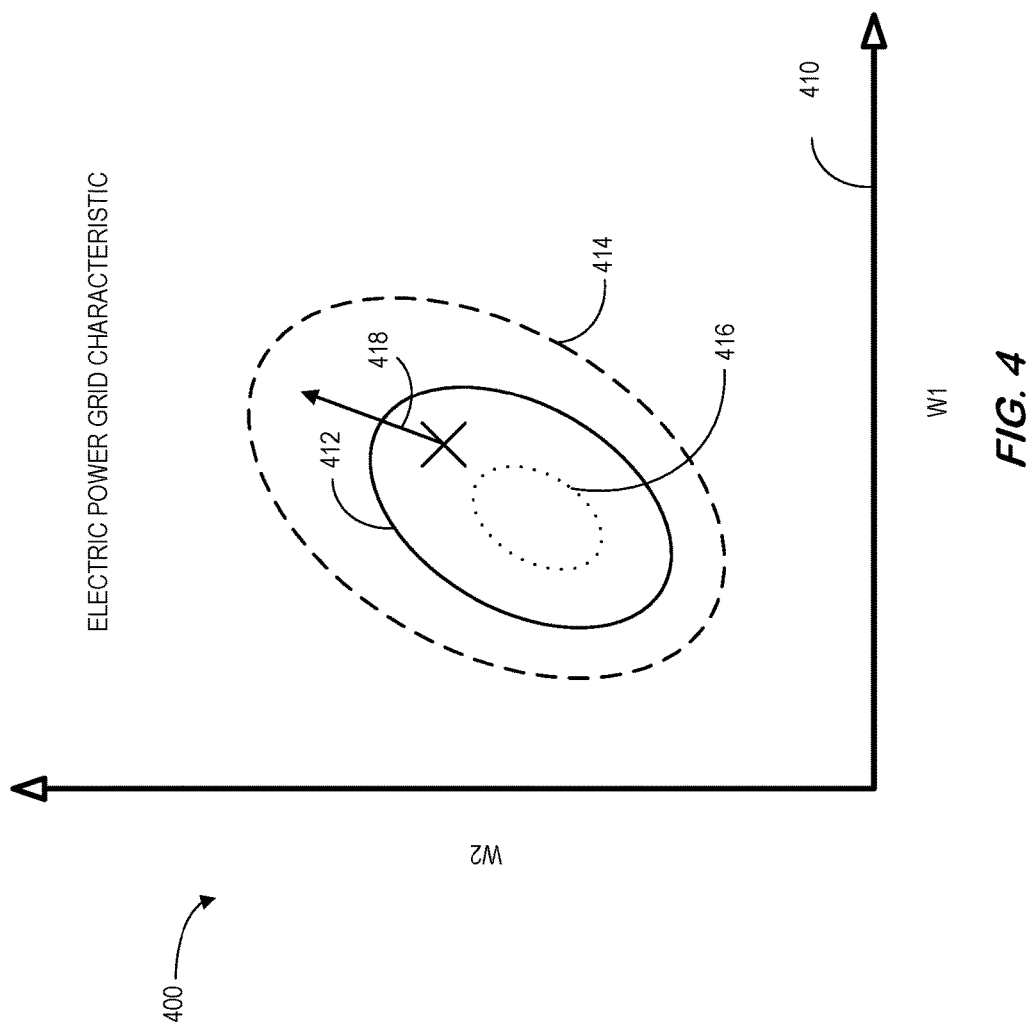
FIG. 4 illustrates boundaries and a feature vector for an electric power grid parameter according to some embodiments.

FIG. 4 illustrates 400 boundaries and a feature vector that might be associated with data source node parameters in accordance with some embodiments. In particular, a graph 410 includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") that is performed on the input data. PCA might be one of the features that might be used by the algorithm to characterize the data, but note that other features could be leveraged.

The graph includes a hard boundary 412 (solid curve), a minimum boundary 416 (dotted curve), and a maximum boundary 414 (dashed curve) and an indication associated with current feature location for the data source node parameter (illustrated with an "X" on the graph). As illustrated in FIG. 4, the current data source node location is between the minimum and maximum boundaries (that is, the "X" is between the dotted and dashed lines). As a result, the system may determine that the operation of the electric power grid is normal (and no threat is being detected indicating that the system is currently under attack).

Existing methods for detecting abnormal conditions in data source nodes are limited to FDIA (which itself is very limited). The cyber-attack detection and localization algorithms described herein can not only detect abnormal signals of sensors, but can also detect signals sent to auxiliary equipment, control intermediary parameters and/or control logical(s). The algorithm can also understand multiple signal attacks. One challenge with correctly identifying a cyber-attack threat is that it may occur with multiple sensors being impacted by malware nearly at once. According to some embodiments, an algorithm may identify in real-time that an attack has occurred, which sensor(s) are impacted, and declare a fault response. To achieve such a result, the detailed physical response of the system must be known to create acceptable decision boundaries. This might be accomplished, for example, by constructing data sets for normal and abnormal regions by running Design of Experiments ("DoE") experiments on high-fidelity models. A data set for each sensor might comprise a feature vector for given threat values. Full factorial, Taguchi screening, central composite and Box-Behnken are some of the known design methodologies used to create the attack space. When models are not available, these DoE methods are also used to collect data from real-world power generator systems. Experiments may be run at different combinations of simultaneous attacks. In some embodiments, the system may detect degraded/faulty operation as opposed to a cyber-attack. Such decisions might utilize a data set associated with a degraded/faulty operating space. At the end of this process, the system may create data sets such as "attack v/s normal" and "degraded v/s normal" for use while constructing decision boundaries. Further note that a decision boundary may be created for each signal using data sets in feature space. Various classification methods may be used to compute decision boundaries. For example, binary linear and non-linear supervised classifiers are examples of methods that could be used to obtain a decision boundary.

Note that embodiments might utilize temporal and/or spatial normalization. Temporal normalization may provide normalization along a time axis. Spatial normalization may be used to normalize signals along multiple nodes (e.g., sensor axis). In either case, the normalized signals may then be used to perform attack detection using feature extraction and comparisons to decision boundaries. Sensor, actuator, and controller node time-series data (as well as other types of data) may be processed in substantially real-time to extract "features" from this data. The feature data may then be compared to a decision boundary to determine if a cyber-attack has occurred to the system. A similar approach may be used for detecting attacks in spatially normalized data.

The processing of the real-time data may utilize a normal operating point of the electric power grid. This normal operating point might be determined, for example, based on system operating modes, external conditions, system degradation factors, etc. The real-time measured sensor data, actuator data, and controller nodes data may be processed such that a difference between actual and nominal values is computed and this difference, or delta, is normalized with the expected operating conditions coefficients.

Figure 5:
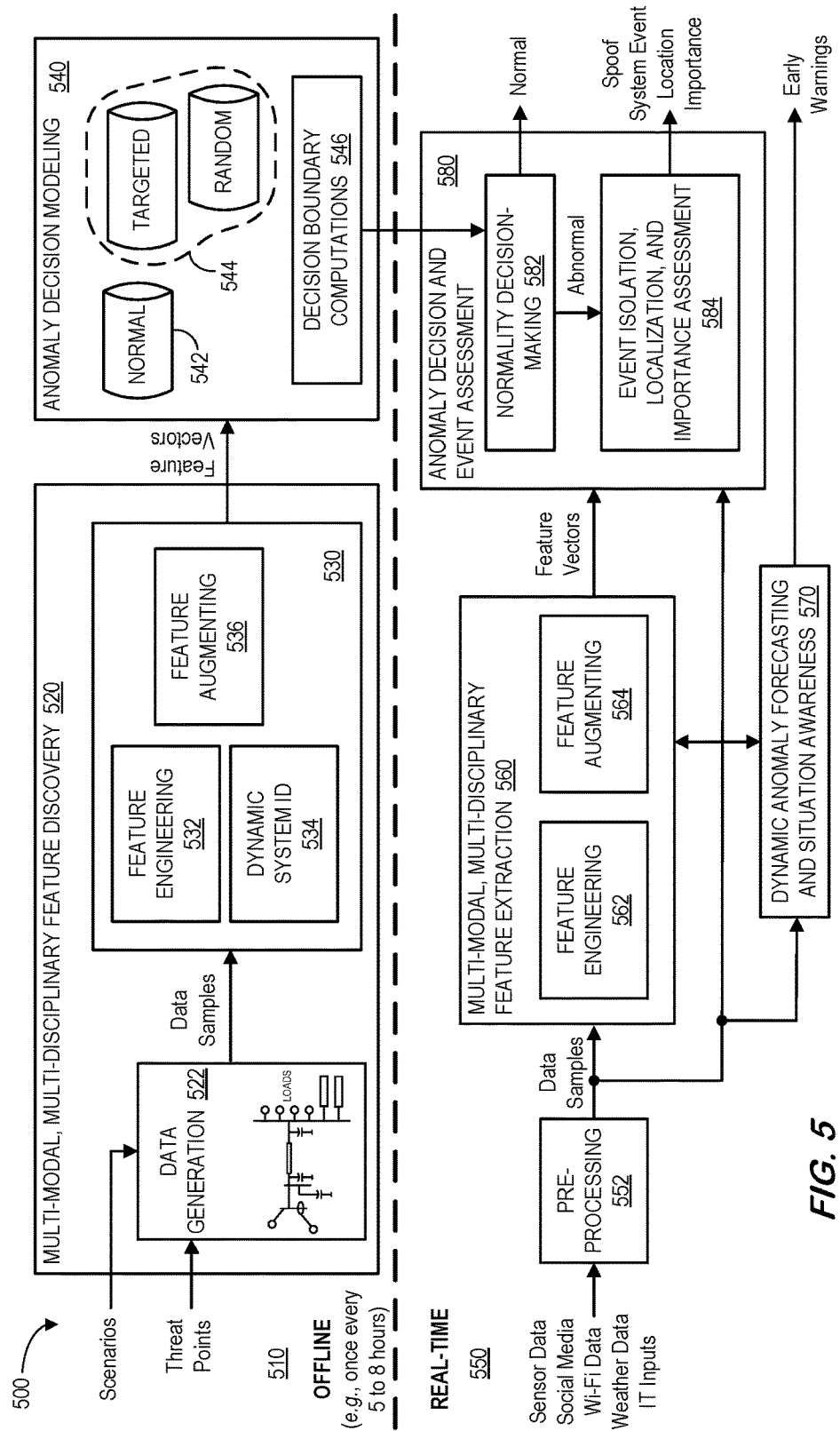
FIG. 5 is an offline and real-time anomaly decision and early warning tool architecture according to some embodiments.

FIG. 5 is an offline and real-time anomaly decision and early warning tool architecture 500 according to some embodiments. In particular, the architecture 500 includes an offline portion 510 (e.g., that performs calculations once every 6 to 8 hours) and a real-time portion 550. The offline portion 510 includes a Multi-Model, Multi-Disciplinary ("MMMD") feature discovery element 520 that receives scenarios and threat points. The scenarios and threat points may, for example, be provided to a data generation element 522 (e.g., associated with a power system model) that generates data samples that are provided to feature engineering 532, dynamic system identification 534, and/or feature augmenting 536 elements of a feature discovery element 530 that in turn provides feature vectors to an anomaly decision modeling system 540. The anomaly decision modeling system 540 may include normal data 542 and abnormal data 544 (e.g., targeted data and random data) that are used, along with the received feature vectors, by decision boundary computations 546 to output feature boundaries to an anomaly decision and event assessment element 580 in the real-time portion 550 of the architecture 500.

The real-time portion 550 of the architecture 500 may also include a pre-processing element 552 that receives information from homogeneous sources, such as sensor data, social media data (e.g., tweets concerning the performance of the power grid), Wi-Fi data, weather data, IT inputs, etc. The pre-processing element 552 may then generate data samples that are provided to a MMMD feature extraction unit 560 and a dynamic anomaly forecasting and situation awareness element 570 (e.g., to generate early warnings). The feature extraction unit 560 might include, for example, feature engineering 562 and feature augmenting 564, and provide feature vectors to the anomaly decision and event assessment element 580. According to some embodiments, the anomaly decision and event assessment element 580 includes normality decision making 582 (e.g., to generate a normal indication) and event isolation, localization, and importance assessment element 584 (e.g., to generate spoof indications, system event indications, location indications, importance indications, etc.).

According to some embodiments, the architecture 500 may implement a proposed framework that consists of two steps: (1) a feature-based model-assisted learning approach 510 for use in offline computation at a frequency of, for example, approximately four times a day; and (2) real-time, high speed detection process 550 (e.g., operating from approximately once every second to once every minute) that leverages heterogeneous data sources. The offline decision boundary tool 510 may use a physics-based power systems model (e.g., associated with the data generation element 522) to characterize different operation points as normal or abnormal conditions. The system may also flag abnormal events that may be associated with critical targets from a cybersecurity perspective. For this purpose, operation points may be defined to include normal operating points and any known vulnerabilities. The real-time tool 550 may use the decision boundary, various mapping functions built during the offline process 510 and real-time data from heterogeneous sensors to identify abnormal conditions from normal operation of the system.

The offline tool 510 might be run, for example, approximately two to four times per day, to represent an expected highest and lowest loading point for the electric power grid during that day. The power system model associated with the data generation element 562 may consist of network topology with power system components such as generators and transmission lines. Note that any of these physical grid assets may be potentially subject to a cyber-attack. According to some embodiments, synthetic data may be generated for a set of pre-determined operating points from several virtual sensors embedded in the model.

Figure 6:
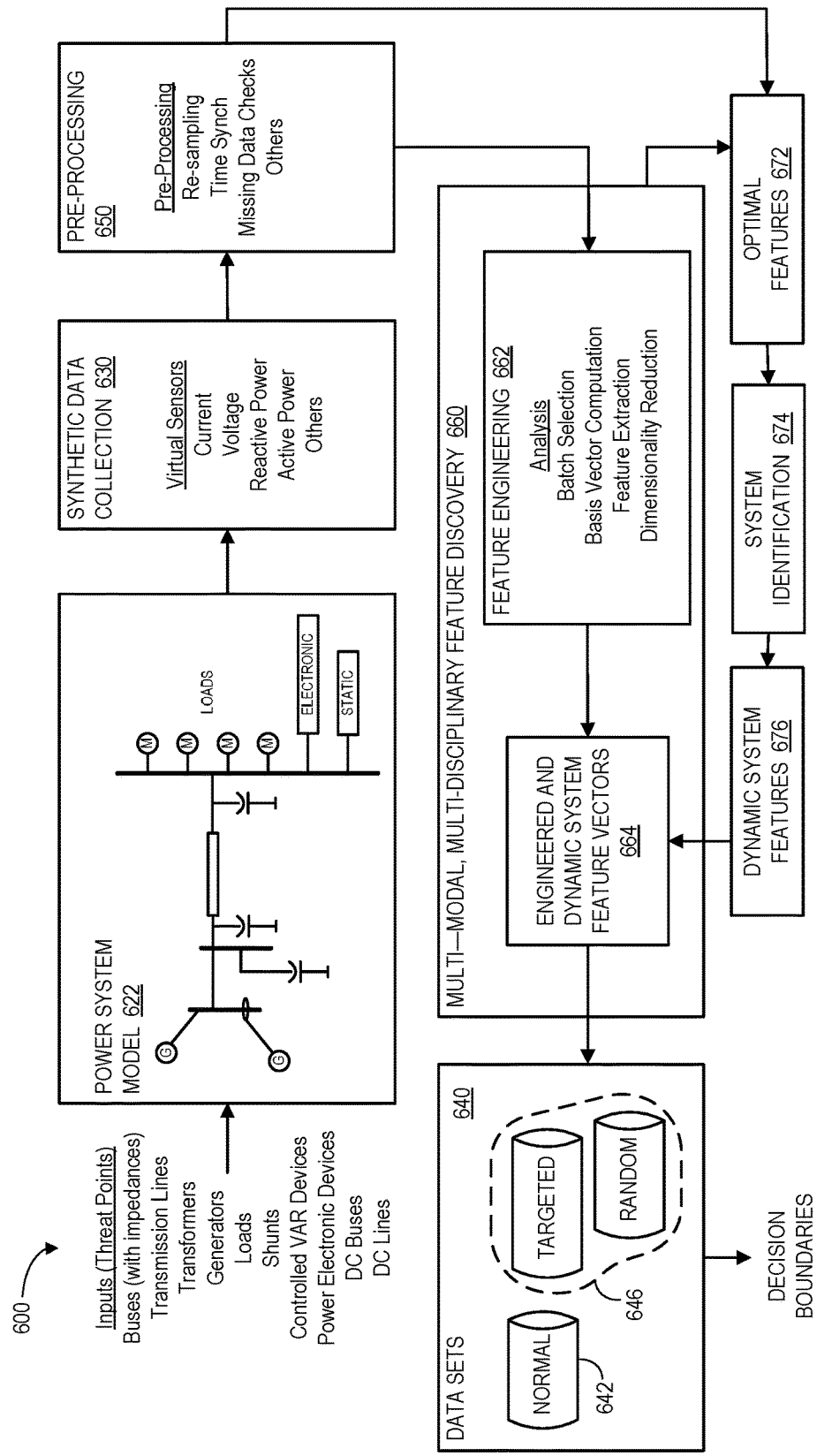
FIG. 6 is an offline anomaly decision boundary tool in accordance with some embodiments.

FIG. 6 is an offline anomaly decision boundary tool 600 in accordance with some embodiments. In particular, the tool 600 illustrates key steps used in a feature-based framework for offline computation. A power system model 622 may receive inputs (e.g., threat points) associated with, for example, buses (with impedances), transmission lines, generators, loads, shunts, controlled Volt-Ampere Reactive ("VAR") devices, power electronic devices, DC buses, DC lines, etc. Synthetic data collection 630 (e.g., associated with virtual sensors, current, voltage, reactive power, active power, etc.) may receive information from the power system model and provide data to pre-processing 650. The pre-processing 650 might be associated with, for example, re-sampling, time synchronization, missing data checks, etc. and may help test a realistic scenario in a controlled simulation environment by creating abnormal scenarios for sensed data streams.

The pre-processed 650 sensor data is converted to salient features using a Multi-Modal, Multi-Disciplinary ("MMMD") feature discovery framework 660 that may employ machine learning to identify knowledge-based, shallow, and/or deep features by maximally leveraging the conventional (e.g., existing) and unconventional data sources. Note that the MMMD feature discovery framework may be associated with feature engineering 662 (e.g., associated with analysis such as batch selection, basis vector computation, feature extraction, dimensionality reduction, etc.) and engineered and dynamic system feature vectors 664. Moreover, pre-processing 650 information may pass through optimal features 672, system identification 674, and/or dynamic system features 676 before being provided to the engineered and dynamic system feature vectors 664. The MMMD feature discovery framework 660 may, according to some embodiments, output data sets (e.g., normal data 642 and abnormal data 6446 such as targeted data and random data) to be used to generate decision boundaries.

A subset of these features may be used for constructing a dynamic state space model in feature space that will model the time evolution of the features. This information may be augmented to the previous set of engineered feature vectors. Thus, the augmented feature vector may contain information from a physics-based model and the dynamic nature of the features themselves. For simplicity, time evolution with data from sensors within one processing batch might be utilized. According to some embodiments, feature maps (e.g., basis vectors, feature vector dimension, feature parameters, etc.) will be stored for use during real-time operation. Various possible threat scenarios may be simulated for a given operating condition, and the importance of these threat scenarios with respect to their impact on a power system phenomenon (e.g., voltage stability, inter-area oscillatory stability, etc.) may be quantified using a feature-based algorithm that exploits underlying network structure information. This may help characterize and rank the threats from the perspective of a large-scale power system phenomenon.

According to some embodiments (e.g., as described in connection with FIGS. 8 and 9 after discussing FIG. 7), complex network theory may be leveraged to identify threat points that are critical to maintain power grid integrity and acceptable quality-of-service. The randomness of system events may be simulated by removing one node (or a pair of nodes) at a time in the power system model randomly to distinguish their feature sets from those of feature sets during normal operation.

This process may be iterated for different operating points to create a random set of data and a targeted set of data. The combination of the features from the random set and the targeted set may provide an abnormal data set that designates abnormal grid conditions. Decision boundaries may then be obtained using normal and abnormal data sets in a binary classifier. The abnormal data set may represent conditions under any system event (such as coordinated cyber-attack, faults, and spoofing). Note that a sophisticated attacker might want to target critical components of a grid (as that has the potential of causing the maximum damage). As a result, this process may also generate an importance index for the nodes that can be used during a real-time decision making process.

Figure 7:
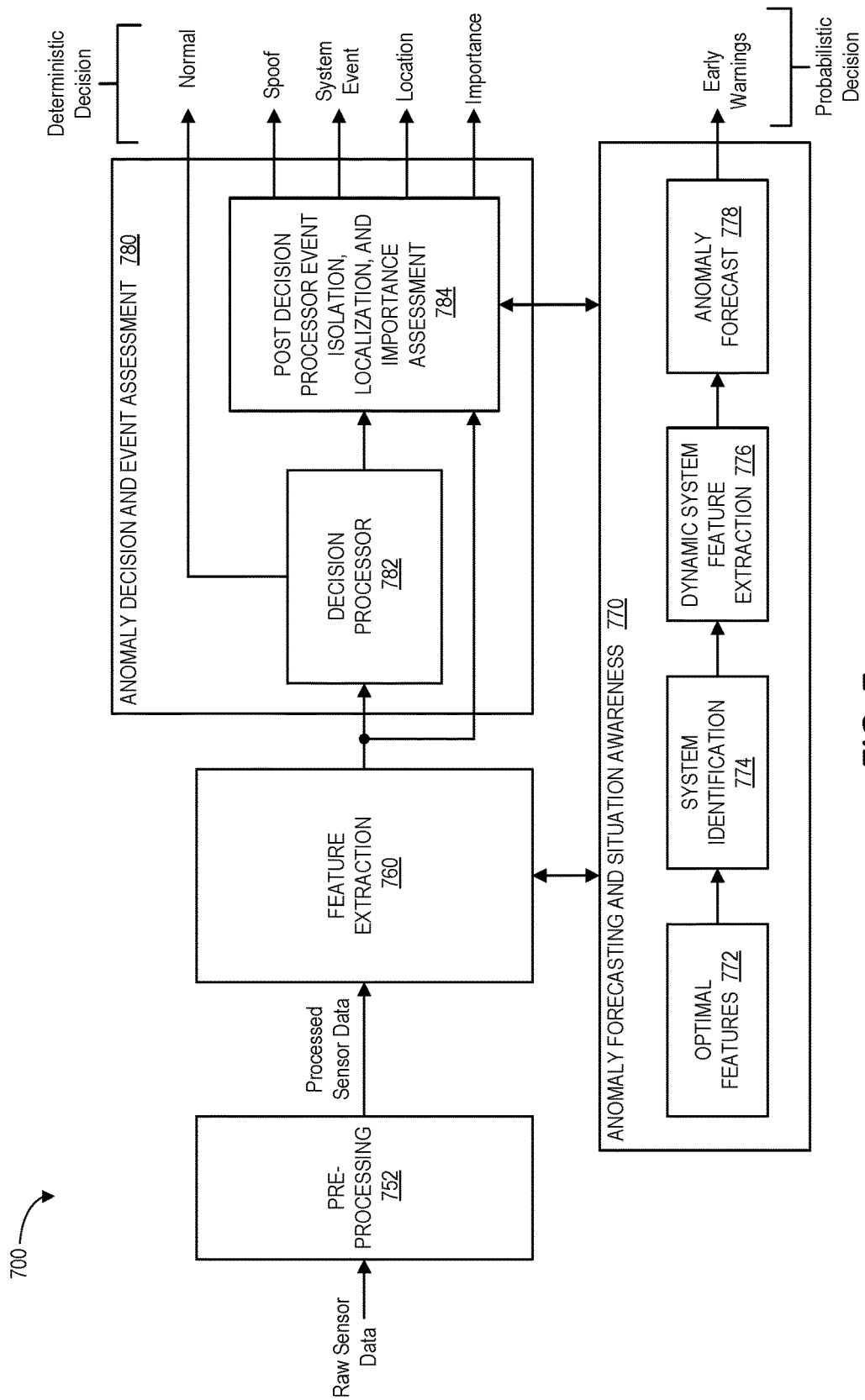
FIG. 7 illustrates a real-time decision, event/threat assessment, and early warning system according to some embodiments.

FIG. 7 illustrates a real-time decision, event/threat assessment, and early warning system 700 according to some embodiments. The real-time components may include, for example, pre-processing 752 (e.g., associated with resampling, time synchronization, missing data checks, conditioning, etc.) that receives raw sensor data and generates processed sensor data. A feature extraction unit 760 (e.g., associated with feature engineering for vector knowledge based shallow/deep learning and/or a feature augmenter for engineered and/or dynamic system feature vector functions) may receive the processed sensor data and provide information to a decision processor 782 of an anomaly decision and event assessment unit 780. The decision processor 782 may generate a normal indication (if appropriate) and/or provide abnormal data to a post decision processor event isolation, localization, and importance assessment module 784. The post decision processor event isolation, localization, and importance assessment unit 784 may, for example, receive social media data, Wi-Fi data, weather data, communication network data, etc. and generate spoof indications, system event indications, location indications, importance indications, etc. (e.g., deterministic decisions). An anomaly forecasting and situation awareness engine 770 may include optimal features 772, system identification 774, dynamic system feature extraction 776, and/or an anomaly forecast element 778 to generate early warning indications for spoofs or systems events (e.g., probabilistic decisions).

In real-time, raw sensor data may be obtained from traditional power system sensors like Remote Terminal Units ("RTUs"), Digital Fault Recorders ("DFRs"), and modern sensors like transmission and distribution Phasor Measurement Units ("PMUs"), micro-PMUs, and smart meters. This may be in addition to non-traditional sources like Wi-Fi activity, text messaging activity, cyber infrastructure status inputs, and/or social media and internet feeds. Note that some power grid implementations may include messaging sensors that provide status messages (e.g., a message that indicates that a grid is "healthy" or "not healthy") and this type of data may be included as additional sensed data. Pre-processing 752 may be performed to align the datasets and identify the possibility of data integrity attacks (e.g., associated with spoofing). In this step, the system may import various feature mapping functions generated in the offline decision boundary tool for use in real-time. This feature set may be augmented further with salient features from the dynamic system by performing system identification on current and past select sets of optimal features. The dynamic system model may be updated, for example, in real-time for use in forecasting and situation awareness.

The augmented feature set may be comprised of both static and dynamic features and may be compared against the decision boundaries constructed from offline analysis so a decision can be made with a corresponding confidence interval. This feature set may also be used for the anomaly forecasting and situation awareness engine 770 to enable early warning of impending threats. If an abnormality is detected, the feature set may be further analyzed inside the post decision processing module 784. In this module 784, the abnormality event may be assessed further using both conventional and unconventional sensor data and classified as spoofing and bad data, a system event, a cyber-physical attack, etc. Note that this decision and classification may be considered deterministic in nature. The location and the criticality or importance of the said abnormality location may also be assessed using the bad data detection framework and complex network theory models developed during the offline computations. More probabilistic decisions might come from the anomaly forecasting and situation awareness engine 770 in which anomaly forecasting is done for early warning using updated dynamic state space models from real-time features.

According to some embodiments, data may be received in steams or batches. The anomaly decision and event assessment engine 770 of FIG. 7 may provide a deterministic decision about the system status (e.g., "normal," "spoofing," or "system event"). Before an anomaly happens, the deterministic system status may be "normal" and it may remain normal until an anomaly actually happens. The engine 770 may detect an anomaly once it happens and decide whether it a spoofing situation or a system event. The anomaly forecasting and situation awareness engine 770 may provide a probabilistic decision and generate early warnings for the power grid. At each time instant, a situation awareness block may project a current status into the future using a stochastic dynamic forecast. The probabilistic status may remain normal until the confidence interval of the normal status becomes sufficiently large (and the confidence level drops) that the situation warrants an early warning indication. Once an early warning is generated, future forecasting may continue with a probabilistic decision about whether an upcoming forecasted anomaly is an attack or a fault (with associated probabilities of occurrence for each). Between the time an early warning is generated and the time an anomaly actually happens, the confidence intervals of attack and fault may tighten (and the confidence levels may increase) until a minimum is reached (representing a maximum confidence) at the time of an actual anomaly (at which point the deterministic status may also reflect the anomaly). The future forecasting may still continue with the situation awareness block (with the confidence intervals naturally increasing as the prediction horizon expands).

As the system receives continuous updates from different sensors, the proposed framework and methods may flag any suspected abnormalities along with a confidence interval. A deterministic decision may represent a firm decision, whereas a probabilistic decision may be associated with a future forecast. In the deterministic decision, the system may provide the location and an assessment of the importance of the attack with respect to electric power grid. A power grid operator may then choose to view the location of the abnormality and/or the sensors that are feeding the abnormal data. The power grid operator may also decide to make further control selections as appropriate.

According to some embodiments, a complex network approach may help identify critical assets and nodes in a power grid in order to determine their vulnerability to cyber threats. In such an approach, a power system model ("grid model") that represents the normal operating condition of the grid may be used. The power system model might consist of static network information such as network topology, impedance of power lines and transformers that connect the various buses and the generators and loads (e.g., represented as power injections at the respective buses). The power system model might be augmented with dynamic data such as sub-transient models for different generator assets, motor models for loads and other high-power power electronic devices. According to some embodiments, the power grid may be modeled using a full Differential-Algebraic Equation ("DAE") representation.

Note that complex network theory based models can play a significant role by creating a high level abstraction of the power grid and identifying components which are critical to the vulnerability of the power grid. In some cases, it may be a challenge to distinguish between a malfunction resulting from some random event (e.g., a weather event) and a malfunction from a targeted attack with malicious intent. A complex network theory based analysis can help to identify if a malfunctioning component is a critical one—that is, if the disturbance can spread widely and lead to a potential black out.

Figure 8:
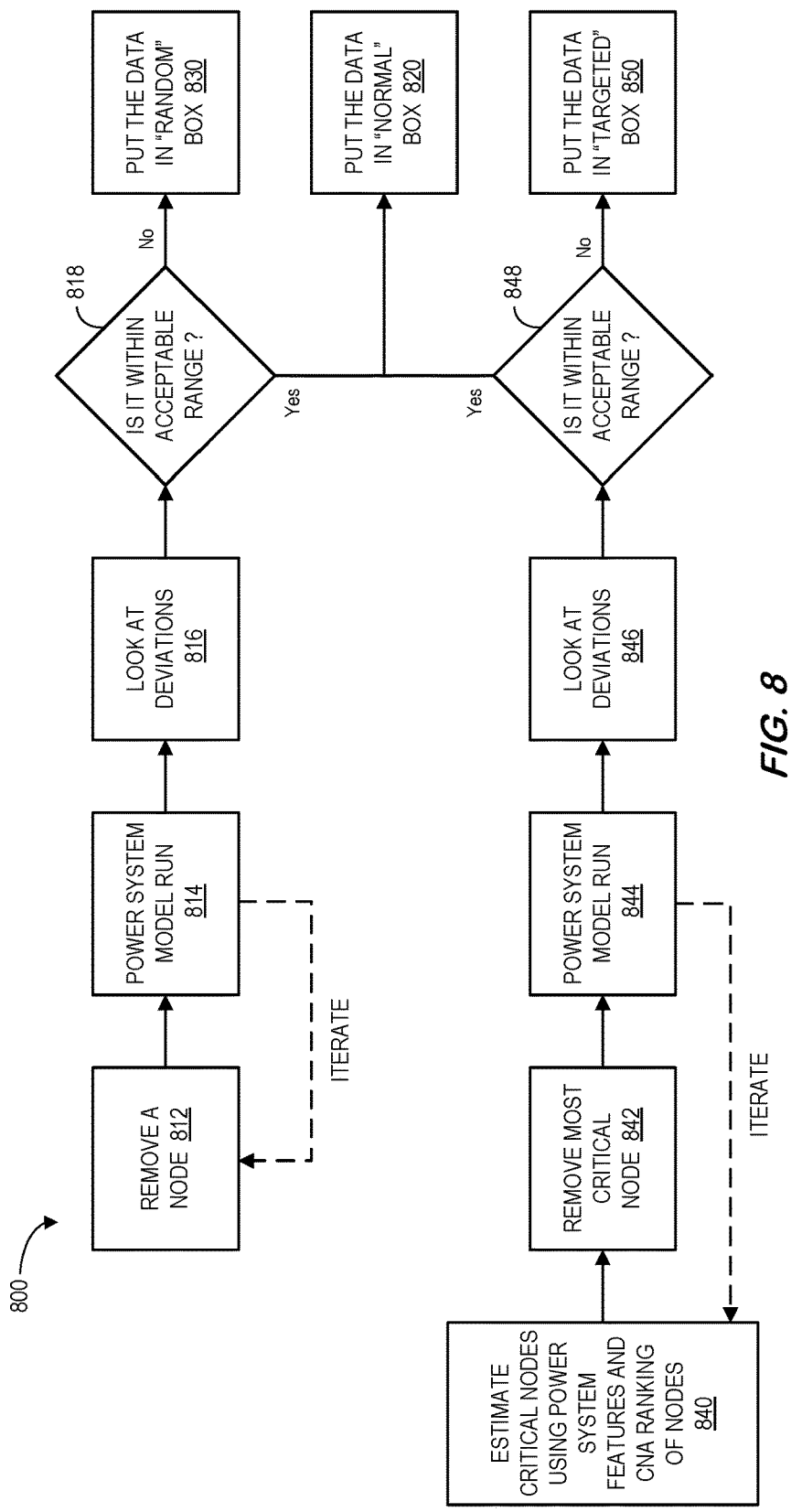
FIG. 8 is a method for detecting cyber threats in accordance with criticality of power grid nodes in accordance with some embodiments.

According to some embodiments, this may be extended to control of the complex network—where some compensatory perturbations are introduced into the power grid to prevent the disturbance from becoming a wide spread black out. A high level architecture for detection cyber threats using node criticality is shown in FIG. 8. Such an approach might be used, for example, to create normal and abnormal data sets using a grid model. According to some embodiments, some or all of the elements of FIG. 8 may be associated with the post decision processing module 784 of FIG. 7. At 812, a node is removed and a power system model is run at 814. This process may be repeated in an iterative fashion. Deviations are examined at 816 and if it is within an acceptable range at 816 the data may be classified as "normal" at 820. If the deviation is not within the acceptable range at 818, the data may be classified as "random" at 830.

At 840, the system may estimate critical notes using power system features and a Complex Network Analysis ("CNA") ranking of nodes. At 842, the most critical node is removed and a power system model is run at 844. This process (including the estimation of 840) may be repeated in an iterative fashion. Deviations are examined at 846 and if it is within an acceptable range at 846 the data may be classified as "normal" at 846. If the deviation is not within the acceptable range at 848, the data may be classified as "targeted" at 850. In some cases, "N−1" criterion for maintaining grid reliability on a day-ahead basis may be important for grid security and operation. According to some embodiments, online screening may be performed during real-time operation to improve certainty. For example, the framework may integrate complex network theory to allow for identification of critical substations and assets. A ranking of critical contingencies and vulnerabilities with respect to grid capacity to carry load, static stability, and transient and inter-area small signal stability may be improved. Note that "Random" 830 and "Tagged" 850 data may be used as abnormal data 544 in the anomaly decision modeling 540.

Thus, scenarios may be created from the "normal grid model" by inducing an event. The event may be a fault or removal of one or several network assets or nodes. Any combination of such "events" may also be used to create a scenario. For each scenario, power system simulation and analysis may be performed wherein the state of the power grid in each of the scenarios is characterized in different dimensions. The dimensions might be, for example, grid carrying capacity, number and location of affected customers, voltage stability, frequency stability, small signal and transient stability, asset overloading, network congestion, non-optimality of power flow solution, etc. Indices may be developed for each of these dimensions and the scenarios may be ranked based on their severity. These indices and rankings may be used along with other power system features to create a feature vector. As a result, the "normal grid model" will have its feature vector, as will every scenario created from the "normal grid model."

Figure 9:
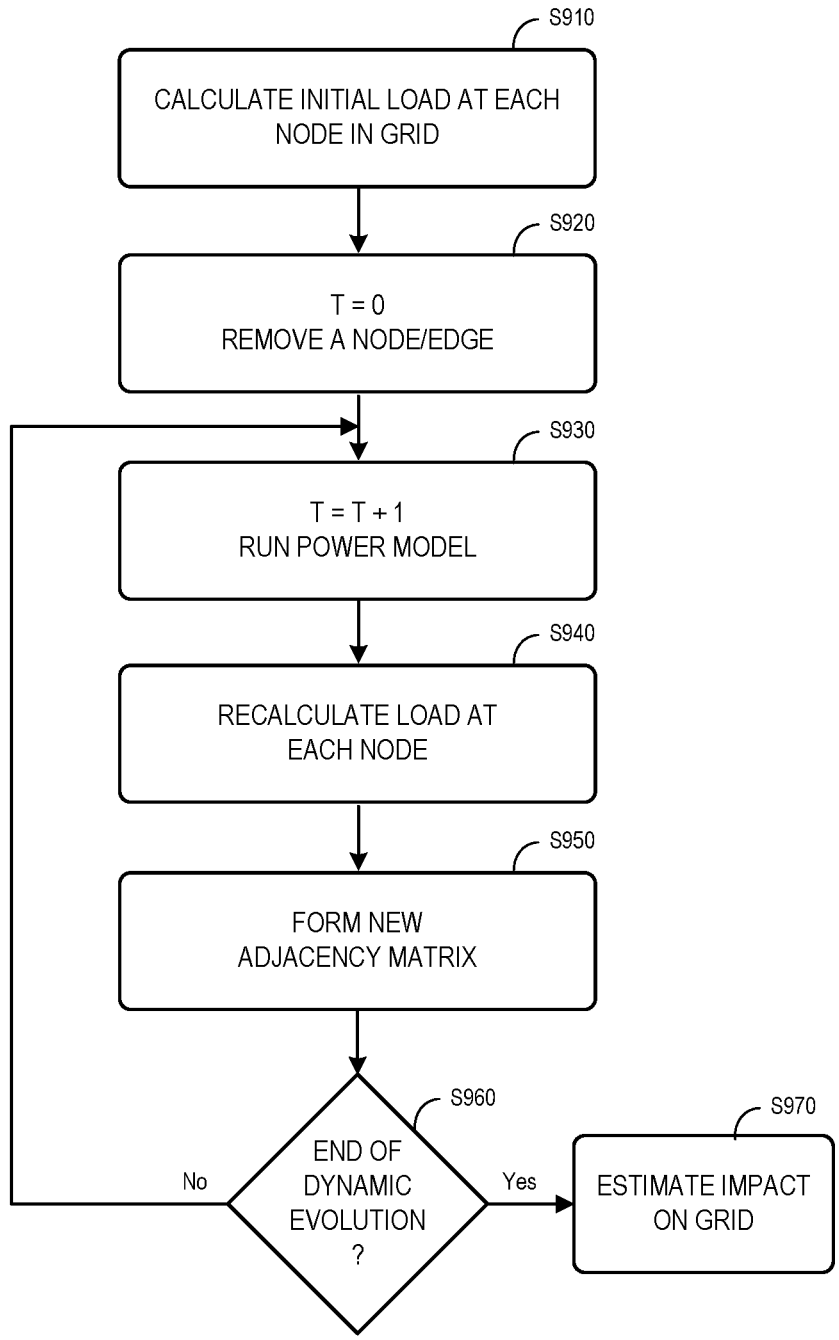
FIG. 9 is a method for estimating importance of power grid nodes according to some embodiments.

This process is shown in FIG. 9. At S910, the system calculates an initial load at each node of a power grid. At S920, t is set to "0" and a node or edge is removed. At S930, at t=t+1 the power model is run. At S940, the load is recalculated at each node to form a new adjacency matrix at S950. If the end of the dynamic evolution is reached at S960, the impact on the power grid is estimated at S970. If the end of the dynamic evolution is not reached at S960, the process continues at S930.

Consider, for example, voltage stability of a power grid. Note that power grid operators have to ensure that voltage at every node in the network is within a nominal range to ensure smooth operation of all power system and customer assets. Acceptable voltage limits are typically specified as 5% above and below a nominal schedule voltage. For example, a 500 kV bus with a nominal scheduled value of 505 kV may need to be between 479.75 kV and 530.25 kV to ensure smooth operation of the power grid. Voltage instability might result from, for example, supply side factors (insufficient reactive power, excess loading on transmission line, etc.) or demand-side factors (fault-induced delayed voltage recovery, large motor load starting, etc.). During such cases, voltage magnitude may be outside the nominal range in a section of the power grid. This situation may require one or more corrective actions (without which a brownout, localized blackout, or even equipment damage might occur). According to some embodiments described herein, a voltage stability critical index may be used to identify the nodes and assets that are most important to maintain voltage stability for the power grid. The voltage stability criticality index for an asset may be computed, for example, based on the impact of its removal on the voltage stability at a grid or local level. The impact may be measured using simple metrics (such as a change in voltage magnitude and reactive power capability) and advanced analytics (such as "proximity to singularity" of the Jacobian matrix). In addition to the indices, the metric that is used for quantifying the importance of the asset may be preserved in the feature vector created for that operating point. Note that a similar analysis might be performed for small signal stability, frequency stability, and other factors (e.g., network congestion, grid carrying capacity, etc.) yielding a feature vector that consists of multi-dimensional criticality indices.

Figure 10:
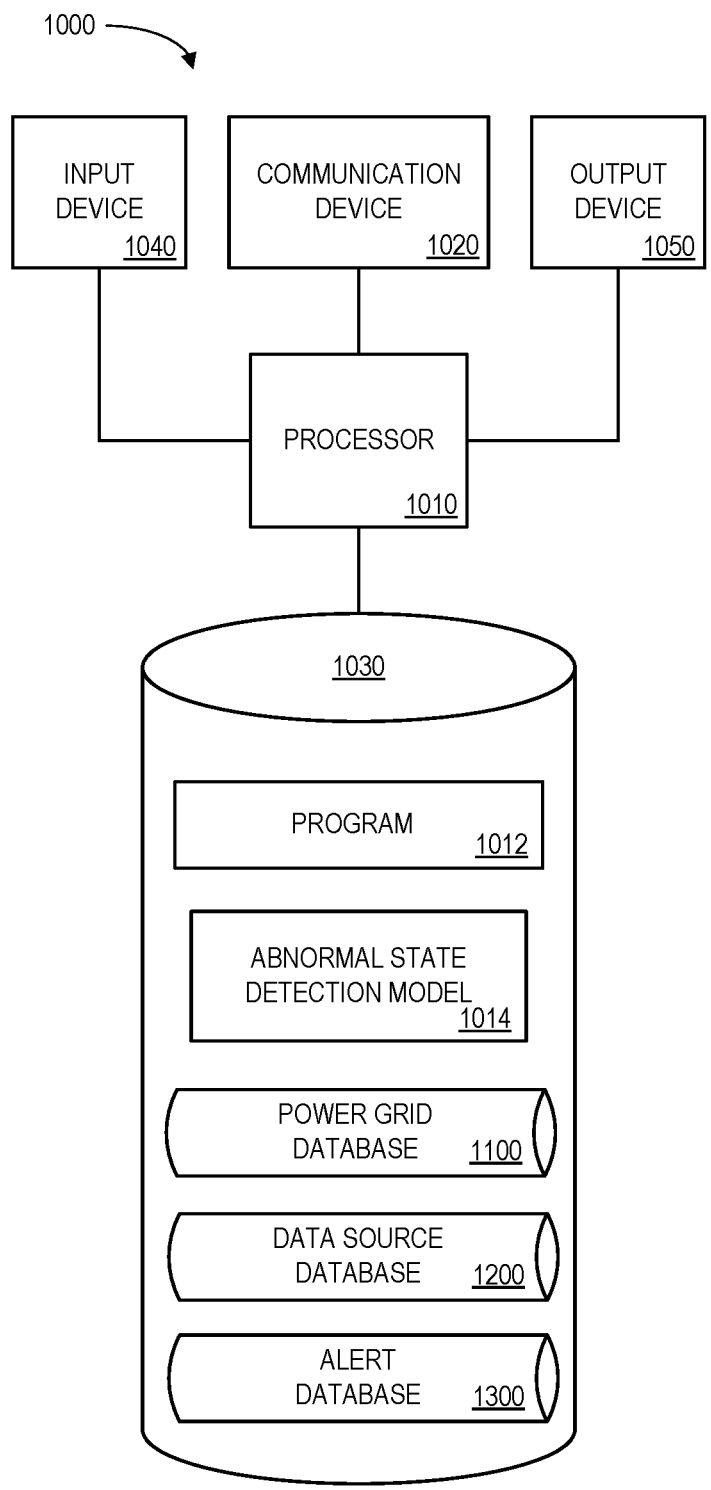
FIG. 10 is a block diagram of an electric power grid protection platform according to some embodiments of the present invention.

The embodiments described herein may be implemented using any number of different hardware configurations. For example, FIG. 10 is a block diagram of an electric power grid protection platform 1000 that may be, for example, associated with the system 100 of FIG. 1. The electric power grid protection platform 1000 comprises a processor 1010, such as one or more commercially available Central Processing Units ("CPUs") in the form of one-chip microprocessors, coupled to a communication device 1020 configured to communicate via a communication network (not shown in FIG. 10). The communication device 1020 may be used to communicate, for example, with one or more remote data source nodes, user platforms, etc. The electric power grid protection platform 1000 further includes an input device 1040 (e.g., a computer mouse and/or keyboard to input power grid information) and/an output device 1050 (e.g., a computer monitor to render a display, provide alerts, transmit recommendations, and/or create reports). According to some embodiments, a mobile device, monitoring physical system, and/or PC may be used to exchange information with the electric power grid protection platform 1000.

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1012 and/or an abnormal state detection model 1014 for controlling the processor 1010. The processor 1010 performs instructions of the programs 1012, 1014, and thereby operates in accordance with any of the embodiments described herein. For example, the processor 1010 may receive streams of heterogeneous data source node signal values over time that represent a current operation of an electric power grid. A real-time threat detection computer, coupled to the plurality of heterogeneous data source nodes, may receive the series of current data source node values and generate a set of current feature vectors. The processor 1010 may access the abnormal state detection model 1014 having at least one decision boundary created offline using a set of feature vectors. The set of feature vectors might include normal feature vectors and/or abnormal feature vectors. For example, in some cases only normal feature vectors might be used along with unsupervised learning algorithms to construct a decision boundary. In such scenarios, abnormal feature vectors might not be used. The abnormal state detection model 1014 may be executed by the processor 1010, and a threat alert signal may be transmitted if appropriate based on the set of current feature vectors and the at least one decision boundary.

The programs 1012, 1014 may be stored in a compressed, uncompiled and/or encrypted format. The programs 1012, 1014 may furthermore include other program elements, such as an operating system, clipboard application, a database management system, and/or device drivers used by the processor 1010 to interface with peripheral devices.

As used herein, information may be "received" by or "transmitted" to, for example: (i) the electric power grid protection platform 1000 from another device; or (ii) a software application or module within the electric power grid protection platform 1000 from another software application, module, or any other source.

In some embodiments (such as the one shown in FIG. 10), the storage device 1030 further stores a power grid database 1100, data source database 1200, and an alert database 1300. Example of databases that may be used in connection with the electric power grid protection platform 1000 will now be described in detail with respect to FIGS. 11 through 13. Note that the databases described herein are only examples, and additional and/or different information may be stored therein. Moreover, various databases might be split or combined in accordance with any of the embodiments described herein.

Figure 11:
FIG. 11 is a tabular portion of a power grid database in accordance with some embodiments.

Referring to FIG. 11, a table is shown that represents the power grid database 1100 that may be stored at the electric power grid protection platform 1000 according to some embodiments. The table may include, for example, entries identifying components associated with an electric power grid. The table may also define fields 1102, 1104, 1106 for each of the entries. The fields 1102, 1104, 1106 may, according to some embodiments, specify: a power grid identifier 1102, a component identifier 1104, and description 1106. The power grid database 1100 may be created and updated, for example, off line (non-real time) when a new electric power grid is monitored or modeled.

The power grid identifier 1102 may be, for example, a unique alphanumeric code identifying an electric power grid to be monitored. The component identifier 1104 might be associated with an element of the power grid and the description 1106 might describe the component (e.g., a transformer, a load, etc.). The power grid database 1100 might further store, according to some embodiments, connections between components (e.g., defining a topology of the grid), component statuses, CNA data, etc.

Figure 12:
FIG. 12 is a tabular portion of data source database in accordance with some embodiments.

Referring to FIG. 12, a table is shown that represents the data source database 1200 that may be stored at the electric power grid protection platform 1000 according to some embodiments. The table may include, for example, entries identifying data sources associated with an electric power grid. The table may also define fields 1202, 1204, 1206 for each of the entries. The fields 1202, 1204, 1206 may, according to some embodiments, specify: a data source identifier 1202, a time series of data values 1204, and description 1206. The data source database 1200 may be created and updated, for example, based on information received from heterogeneous sensors.

The data source identifier 1202 may be, for example, a unique alphanumeric code identifying a data source that might provide information to be monitored to protect an electric power grid. The time series of values 1204 might be associated with a set of numbers being reported by a particular sensor (e.g., representing voltages, currents, etc.) and the description 1206 might describe the type of information being monitored (e.g., from a sensor, social media, weather data, etc.). The data source database 1200 might further store, according to some embodiments, other information such as a power grid identifier or component identifier (e.g., which might be based on or associated with the power grid identifier 1102 and component identifier 1104 described with respect to the power grid database 1100 of FIG. 11).

Referring to FIG. 13, a table is shown that represents the alert database 1300 that may be stored at the electric power grid protection platform 1000 according to some embodiments. The table may include, for example, entries identifying alerts that have been issued in connection with an electric power grid. The table may also define fields 1302, 1304, 1306, 1308 for each of the entries. The fields 1302, 1304, 1306, 1308 may, according to some embodiments, specify: an alert identifier 1302, a power grid identifier 1304, a date and time 1306, and description 1308. The alert database 1300 may be created and updated, for example, when the system detects anomalies.

The alert identifier 1302 might be a unique alphanumeric code identifying a particular abnormal condition identified by the system and the power grid identifier 1304 may identify an electric power grid being monitored (e.g., and may be based on or associated with the power grid identifier 1102 described with respect to the power grid database 1100 of FIG. 11). The date and time 1306 might indicate when the alert was transmitted and the description might describe the type of alert (e.g., a threat, a spoof, an early warning, etc.). The alert database 1300 might further store, according to some embodiments, details about an alert such as localization information, importance information, etc.

Note that cyber security is an important function required in the protection of assets, such as power grid equipment. Dynamic normalization in this space may improve the resolution of detection. The machines associated with power grids can be very complex, and embodiments described herein may permit an implementation of a cyber security algorithm that makes detections fast and reliably. Note that a Receiver Operating Conditions ("ROC") curve might be used to evaluate the use of dynamic normalization for load fluctuations (e.g., including indications of true and false positive detections, true and false negative detections, etc.).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 14:
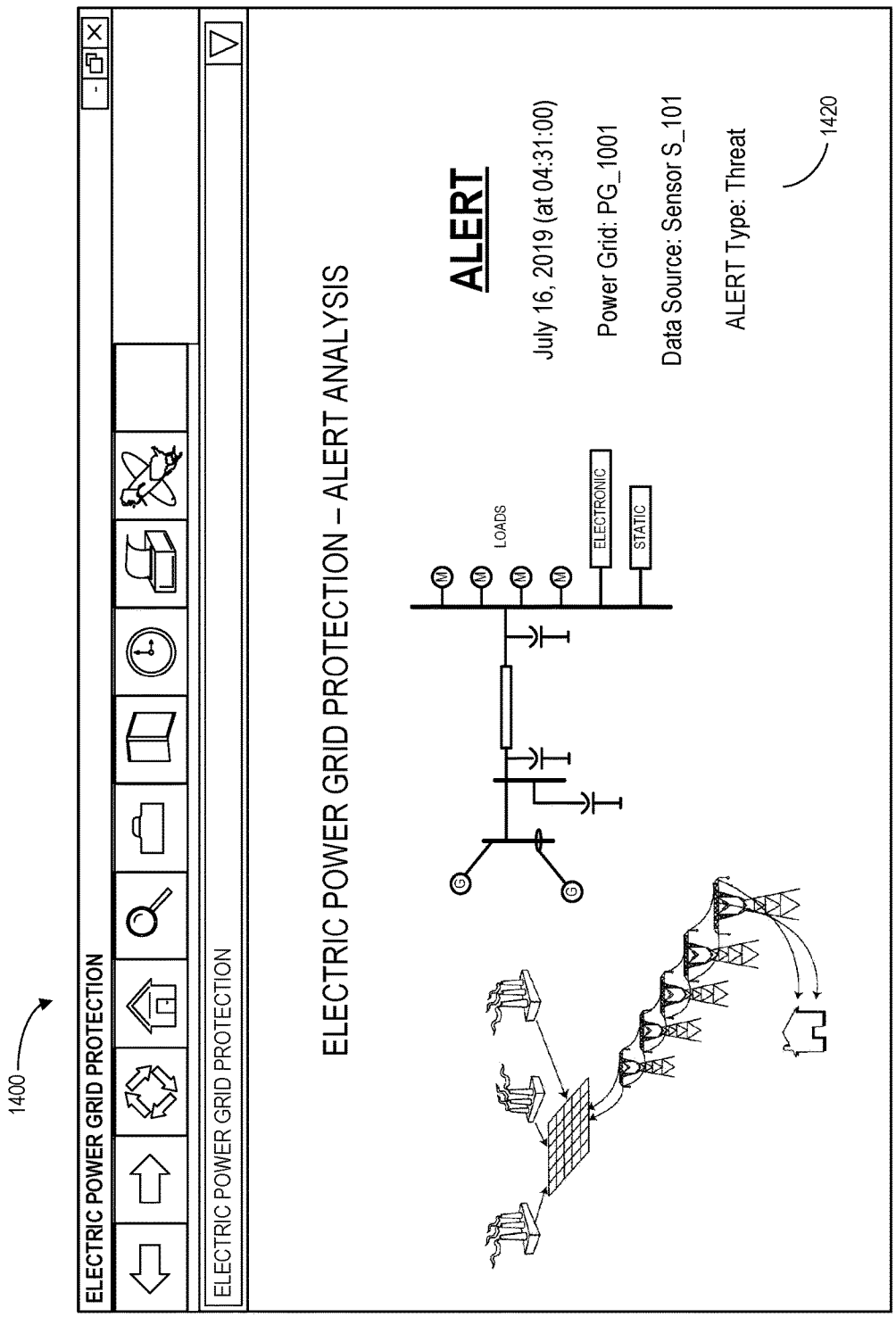
FIG. 14 is a display according to some embodiments.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on electric power grids, any of the embodiments described herein could be applied to other types of assets, such as damns, wind farms, etc. Moreover, note that some embodiments may be associated with a display of information to an operator. For example, FIG. 14 illustrates an interactive Graphical User Interface ("GUI") display 1400 that might display information about an electric power grid alert 1420 (e.g., including details about the type of alert). According to some embodiments, information about attack statuses may be interwoven between different power grids. For example, one power grid might be aware of the status of other nodes (in other power grids) and such an approach might help thwart coordinated cyber-threats.

In addition to automatic threat detection, some embodiments described herein might provide systems with an additional cyber layer of defense and be deployable without custom programming (e.g., when using operating data). Some embodiments may be sold with a license key and could be incorporated as monitoring service. For example, boundaries might be periodically updated when equipment in a power grid is upgraded.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect an electric power grid, comprising:
a plurality of heterogeneous data source nodes each generating a series of current data source node values over time that represent a current operation of the electric power grid; and
a real-time threat detection computer, coupled to the plurality of heterogeneous data source nodes, to:
  (i) receive the series of current data source node values and generate a set of current feature vectors,
  (ii) access an abnormal state detection model having at least one decision boundary created offline using a set of feature vectors,
  (iii) execute the abnormal state detection model and transmit a threat alert signal based on the set of current feature vectors and the at least one decision boundary;
wherein the set of feature vectors includes at least one of: (i) normal feature vectors, and (ii) abnormal feature vectors and the real-time threat detection computer executes the abnormal state detection model; and
wherein the system further comprises:
a normal space data source storing, for each of the plurality of heterogeneous data source nodes, a series of normal data source node values over time that represent normal operation of the electric power grid;
an abnormal space data source storing, for each of the plurality of data source nodes, a series of abnormal data source node values over time that represent an abnormal operation of the electric power grid; and
an offline abnormal state detection model creation computer, coupled to the normal space data source and the abnormal space data source, to:
  (i) receive the series of normal data source node values and generate the set of normal feature vectors,
  (ii) receive the series of abnormal data source node values and generate the set of abnormal feature vectors, and (iii) automatically calculate and output the at least one decision boundary for the abnormal state detection model based on the set of normal feature vectors and the set of abnormal feature vectors.

2. The system of claim 1, wherein at least one of the heterogeneous data source nodes is associated with at least one of: (i) social media data, (ii) wireless network data, (iii) weather data, (iv) information technology inputs, (v) critical sensor nodes of the electric power grid, (vi) actuator nodes of the electric power grid, (vii) controller nodes of the electric power grid, and (viii) key software nodes of the electric power grid.

3. The system of claim 2, wherein information from each of the plurality of heterogeneous data source nodes is normalized and an output is expressed as a weighted linear combination of basis functions.

4. The system of claim 1, wherein the real-time threat detection computer is further to generate: (i) a spoof indication, (ii) a system event indication, (iii) a location indication, (iv) an importance indication, and (v) an early warning indication.

5. The system of claim 1, wherein at least one of the set of normal feature vectors and the set of abnormal feature vectors are associated with at least one of: (i) principal components, (ii) statistical features, (iii) deep learning features, (iv) frequency domain features, (v) time series analysis features, (vi) logical features, (vii) geographic or position based locations, (viii) interaction features, (ix) range, and (x) current value.

6. The system of claim 1, wherein the abnormal state detection model is associated with at least one of: (i) an actuator attack, (ii) a controller attack, (iii) a data source node attack, (iv) a plant state attack, (v) spoofing, (vi) physical damage, (vii) unit availability, (viii) a unit trip, (ix) a loss of unit life, (x) asset damage requiring at least one new part, (xi) a stealthy attack not detectable by alarms, (xii) a load alternating attack, (xiii) a topology change attack, (xiv) a stability compromise attack, and (xv) a frequency compromise attack.

7. The system of claim 1, wherein the abnormal state detection model including the at least one decision boundary is associated with at least one of: (i) a line, (ii) a hyperplane, and (iii) a non-linear boundary separating normal space and abnormal space.

8. The system of claim 1, wherein the offline abnormal state detection model creation computer operates at a frequency between approximately once every six hours and once every eight hours.

9. The system of claim 1, wherein the offline abnormal state detection model creation computer is associated with multi-modal, multi-disciplinary feature discovery.

10. The system of claim 1, wherein the abnormal space data source stores both random abnormal data and targeted abnormal data.

11. The system of claim 1, wherein the offline abnormal state detection model creation computer is associated with a power system model with static network information including at least one of: (i) network topology, (ii) impedance of power lines, (iii) transformer information, (iv) generator data, (v) load data, and (vi) bus information.

12. The system of claim 11, wherein the power system model is a full differential-algebraic equation representation augmented with dynamic data including at least one of: (i) a sub-transient model for a generator asset, (ii) a motor model for a load, and (iii) a model for a high-power electronic device.

13. The system of claim 11, wherein the offline abnormal state detection model creation computer uses a complex network theory analysis to distinguish a random event from a targeted event.

14. A computerized method to protect an electric power grid, comprising:
   retrieving, for each of a plurality of heterogeneous data source nodes, a series of normal data source node values over time that represent normal operation of the electric power grid;
   generating, offline, a set of normal feature vectors based on the normal data source node values;
   retrieving, for each of the plurality of data source nodes, a series of abnormal data source node values over time that represent an abnormal operation of the electric power grid;
   generating a set of abnormal feature vectors based on the abnormal data source node values;
   automatically calculating and outputting, by an offline abnormal state detection model creation computer, at least one decision boundary for an abnormal state detection model based on the set of normal feature vectors and the set of abnormal feature vectors;
   wherein the offline abnormal state detection model creation computer operates at a frequency between approximately once every six hours and once every eight hours; and
   wherein the method further comprises executing the offline abnormal state detection model and transmitting a threat alert signal based on the set of normal feature vectors and the set of abnormal feature vectors and the at least one decision boundary.

15. The method of claim 14, wherein the offline abnormal state detection model creation computer is associated with multi-modal, multi-disciplinary feature discovery.

16. The method of claim 14, wherein the abnormal space data source stores both random abnormal data and targeted abnormal data.

17. A non-transitory, computer-readable medium storing instructions that, when executed by a computer processor, cause the computer processor to perform a method associated with protection of an electric power grid, the method comprising:
   receiving, from a plurality of heterogeneous data source nodes, a series of current data source node values over time that represent a current operation of the electric power grid;
   accessing, by a real-time threat detection computer, an abnormal state detection model having at least one decision boundary created offline using a set of feature vectors;
   executing the abnormal state detection model and transmitting a threat alert signal based on the set of current feature vectors and the at least one decision boundary;
      wherein the set of feature vectors includes at least one of: (i) normal feature vectors, and (ii) abnormal feature vectors and the real-time threat detection computer executes the abnormal state detection model; and
   wherein the method further comprises:
   storing, for each of the plurality of heterogeneous data source nodes, a series of normal data source node values over time that represent normal operation of the electric power grid;

storing, for each of the plurality of data source nodes, a series of abnormal data source node values over time that represent an abnormal operation of the electric power grid;
receiving the series of normal data source node values and generate the set of normal feature vectors;
receive the series of abnormal data source node values and generate the set of abnormal feature vectors, and
automatically calculate and output the at least one decision boundary for the abnormal state detection model based on the set of normal feature vectors and the set of abnormal feature vectors.

18. The system of claim 17, wherein at least one of the heterogeneous data source nodes is associated with at least one of: (i) social media data, (ii) wireless network data, (iii) weather data, (iv) information technology inputs, (v) critical sensor nodes of the electric power grid, (vi) actuator nodes of the electric power grid, (vii) controller nodes of the electric power grid, and (viii) key software nodes of the electric power grid.

* * * * *

UNITED STATES PATENT AND TRADEMARK OFFICE
CERTIFICATE OF CORRECTION

PATENT NO. : 10,452,845 B2
APPLICATION NO. : 15/453544
DATED : October 22, 2019
INVENTOR(S) : Lalit Keshav Mestha et al.

Page 1 of 1

It is certified that error appears in the above-identified patent and that said Letters Patent is hereby corrected as shown below:

On the Title Page

(72) Inventors:
Line 9, replace "Annartia" with "Annarita."

Signed and Sealed this
Twenty-sixth Day of November, 2019

Andrei Iancu
*Director of the United States Patent and Trademark Office*